US008279127B2

(12) United States Patent
Ahlberg et al.

(10) Patent No.: US 8,279,127 B2
(45) Date of Patent: Oct. 2, 2012

(54) COMMUNICATION SOLUTION FOR ANTENNAS

(75) Inventors: Mikael Ahlberg, Täby (SE); Michael Wiklund, Solna (SE)

(73) Assignee: Powerwave Technologies Sweden AB, Kista (SE)

( * ) Notice: Subject to any disclaimer, the term of this patent is extended or adjusted under 35 U.S.C. 154(b) by 481 days.

(21) Appl. No.: 12/441,375

(22) PCT Filed: Sep. 12, 2007

(86) PCT No.: PCT/SE2007/000795

§ 371 (c)(1), (2), (4) Date: Mar. 5, 2010

(87) PCT Pub. No.: WO2008/033076

PCT Pub. Date: Mar. 20, 2008

(65) Prior Publication Data

US 2010/0164803 A1 Jul. 1, 2010

(30) Foreign Application Priority Data

Sep. 15, 2006 (SE) ...................................... 0601909

(51) Int. Cl.
*H01Q 3/30* (2006.01)
*H04B 1/18* (2006.01)

(52) U.S. Cl. ...................... 343/757; 342/372; 455/562.1

(58) Field of Classification Search .................. 342/372; 343/757, 754; 455/562.1
See application file for complete search history.

(56) References Cited

U.S. PATENT DOCUMENTS

2002/0132644 A1 9/2002 Mellor et al.
2005/0012665 A1 1/2005 Runyon et al.
2005/0113047 A1 5/2005 Kim

FOREIGN PATENT DOCUMENTS

WO 99/09661 2/1999
WO 00/24121 4/2000
WO WO 2006056886 1/2006
WO WO 2006057613 1/2006
WO 2006/057612 6/2006

OTHER PUBLICATIONS

Strickland, Peter and Bacchus, Fazel, "Microstrip Base Station Antennas for Cellular Communications," IEEE, 1991, p. 166-171, CH2944-7/91/0000/0166.
PCT International Search Report for International Application No. PCT/SE2007/000795 dated Dec. 21, 2007.

*Primary Examiner* — Jack W Keith
*Assistant Examiner* — Fred H Mull
(74) *Attorney, Agent, or Firm* — OC Patent Law Group

(57) ABSTRACT

An improved control system for controlling radiation direction of an antenna beam of an antenna is disclosed. The radiation direction is adjustable by an actuating device influencing phase shifting means based on an actuating signal. The system includes filtering means, arranged for filtering out a control signal and being connected, in use, to a feeder cable arranged for carrying RF signals and control signals. The system further includes an external control unit including detecting means, arranged for detecting the filtered out control signal, and control means, arranged for producing the actuating signal based on the detected control signal. The filtering means is directly connected to the external control unit so as to provide the filtered out control signal directly to the external control unit.

17 Claims, 5 Drawing Sheets

COMMUNICATION SOLUTION FOR ANTENNAS

FIELD OF THE INVENTION

The present invention relates to a control system for controlling radiation direction of an antenna beam as defined in the preamble of claim 1.

The present invention also relates to a method for controlling radiation direction of an antenna beam as defined in the preamble of claim 18.

The present invention also relates to a base station for controlling radiation direction of an antenna beam.

The present invention also relates to a communication system for controlling radiation direction of an antenna beam.

Related Art and Background of the Invention

Such control systems and control methods are previously known from WO2006057613 (PCT/SE2005/001777).

In this control system, the radiation direction of an antenna can be remotely adjusted in order to adapt a cell size to varying environmental factors, such as location of an antenna, geographic topography and the presence or absence of buildings. The cell size and thus also the radiation direction can also vary for different types of mobile systems using different frequencies.

The radiation direction is altered by applying phase shifts between transmitting antenna elements in antenna arrays in such a way that radiation from a number of antenna elements is combined for obtaining a combined beam. The direction of this combined beam can then be altered by altering the phase shifts.

The phase shifting means typically alters the phase shifts of the antenna elements using an actuating device, such as a motor, situated inside the antenna casing. The motor is driven by motor control logic also situated in the mast top. The motor control logic controls the motor movements based on remote control signals that could be sent from a control centre, which could be located on the ground, at a distance from the antenna. The signals are transmitted from the control centre to the mast top motor control logic over a control signal system.

Control signal systems, as the one used for carrying control signals used for altering the radiation direction in the background art described above, are exposed to the environmental surroundings of the control systems. They have to be protected against damages caused by lightning strikes and the like. These protection actions are often both complicated and expensive to implement.

Aim and Most Important Features of the Invention

It is an object of the present invention to provide a system and a method for controlling the radiation direction of an antenna beam that solves, or at least relieves, the above stated problem.

A further object of the present invention is to provide a base station including such a control system.

A still further object of the present invention is to provide a communication system including such a base station.

In particular it is an object of the present invention to provide a more robust, less complex and less expensive system and method for controlling the antenna beam direction than the control systems and methods known in the background art.

These objects are achieved by an antenna beam radiation direction control system according to the characterizing portion of claim 1.

The objects are also achieved by an antenna beam radiation direction control method according to the characterizing portion of claim 18.

The system and the method for controlling radiation direction of an antenna beam according to the present invention make it possible to connect the filtering means directly to the external control unit and thereby to directly provide the filtered out control signals from the filtering means to the external control unit.

Having the filtering means and external control unit directly connected to each other has the advantage that a number of circuits, in the background art systems, situated between the filtering means and the control means, can be omitted. A cable having fewer conductors can also be used between the CIN (Current Injector) means and the RET (Remote-Controlled Electrical Down-tilt) unit, in the system and method according to the invention, than was used between the CILOC (Current Injector Layer One Converter) and the RET unit in background art systems.

This reduces the complexity of the system and the method. It also makes the system and method more robust, since the complexity and number of circuits in the system has a great impact on how sensitive a system is for environmental hazards. Fewer circuits in the system itself make the production costs lower. Fewer circuits also result in fewer electronic components to protect against environmental problems, which further lower the production costs. Fewer conductors in the cable between the CIN and the RET unit also have the effect that less conductor connections have to be protected against the environment, which also lowers the production costs.

The present invention further has the advantage that a CILOC, used in background art systems for receiving control signals superposed in the RF feeder cable, can be simplified into a simple filtering means, a CIN. This makes the system and the method more robust as well as reduces complexity and production costs.

In different embodiments of the present invention, the filtering means may be placed either inside a TMA (Tower Mounted Amplifier) or outside a TMA.

Placement of the detecting means and the control means within the external control unit has the advantage that these means are better protected there than compared to placement of, for example, the detecting means in a CILOC, as was done in background art systems. A further advantage of placing the detecting means and the control means in this way is that the connections between these means are not exposed to damages from the environment.

Placement of the detecting means and the control means in the external control unit also has the advantage that systems according to the present invention can be used for upgrading existing systems, wherein the existing systems could have different configurations of their antennas.

In an embodiment of the present invention, the control data is OOK modulated directly at the MCU (Master Control Unit). RS485 is thus not used at all for controlling the radiation direction of the antenna, OOK signals are instead used all the way from the MCU to the RET unit. Neither RS485 converting circuits nor RS485 cables are needed for this embodiment, which makes the control system both less complex and less expensive.

Detailed exemplary embodiments and advantages of the control system and method according to the invention will now be described with reference to the appended drawings illustrating some preferred embodiments.

DETAILED DESCRIPTION OF PREFERRED EMBODIMENTS

The AISG standard "Antenna Interface Standards Group, Standard No. AISG1: Issue 1.1, 30 Jul. 2004" defines a standard data interface at an antenna line device by means of which functional parameters of the device can be remotely controlled. The standard specifically defines power and data communication between BTS/Node B and tower top equipment.

The AISG standard states that there are two alternatives for communicating data for remote control between BTS/Node B and the tower top equipment. The first alternative is to use a direct RS485 connection between BTS/Node B and tower top equipment and the second alternative is to use a coaxial cable for carrying power, RF signals and remote control data communication.

Figure 1:
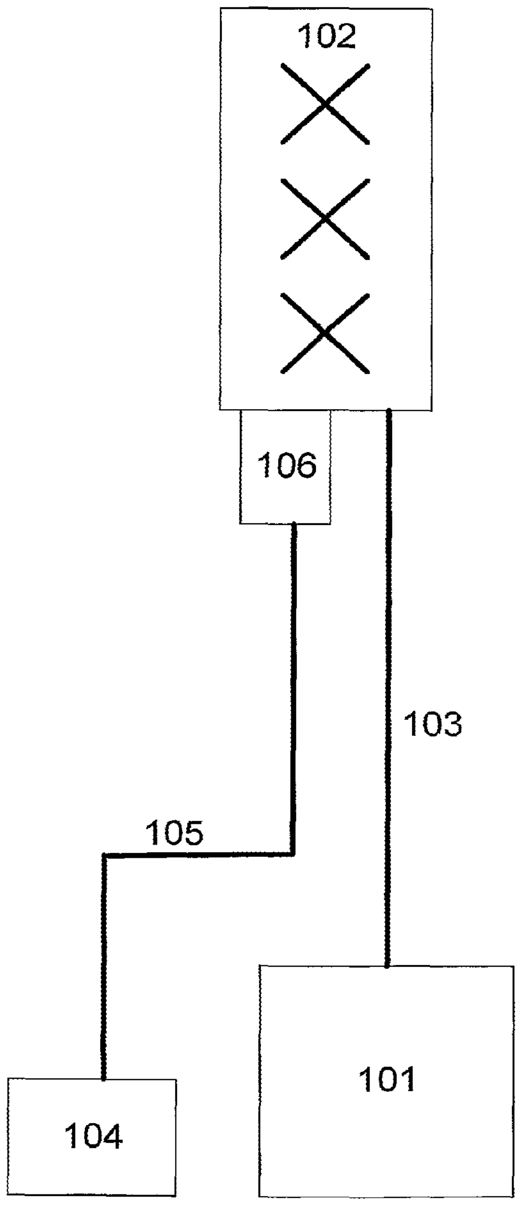
Fig. 1 (Prior Art)
FIG. 1 shows a control system according to the background art.

The first alternative of the standard is shown in FIG. 1. In the system showed in FIG. 1, a BTS/node B 101 is connected to an antenna 102 through a coaxial feeder cable 103. The control data for controlling the radiation direction of the antenna is created in a MCU (Master Control Unit) 104 and sent to an external control unit 106, such as a RET (Remote-Controlled Electrical Down-Tilt) unit, via an RS485 connection 105.

To have an RS485 connection the whole way from MCU 104 up to the RET unit in the mast top is an expensive solution, since the RS485 connection 105 often is quite long and therefore needs to have thick conductor cables to avoid too much attenuation.

When the second alternative is used, the remote control data signals are, usually inside a TMA, converted in a layer-1 converter, also called CILOC (Current Injector Layer One Converter), and a RS485 data connection is used between the CILOC and the antenna. The remote control data communication is thus sent partly over the coaxial antenna feeder cable and partly using a RS485 data connection. On the coaxial cable OOK modulation (On Off Keying modulation) is used for carrying the control information. In OOK the presence or absence of carrier is used for representing the information, a logical 1 is modulated as "carrier off" and a logical 0 s modulated as "carrier on".

Figure 2:
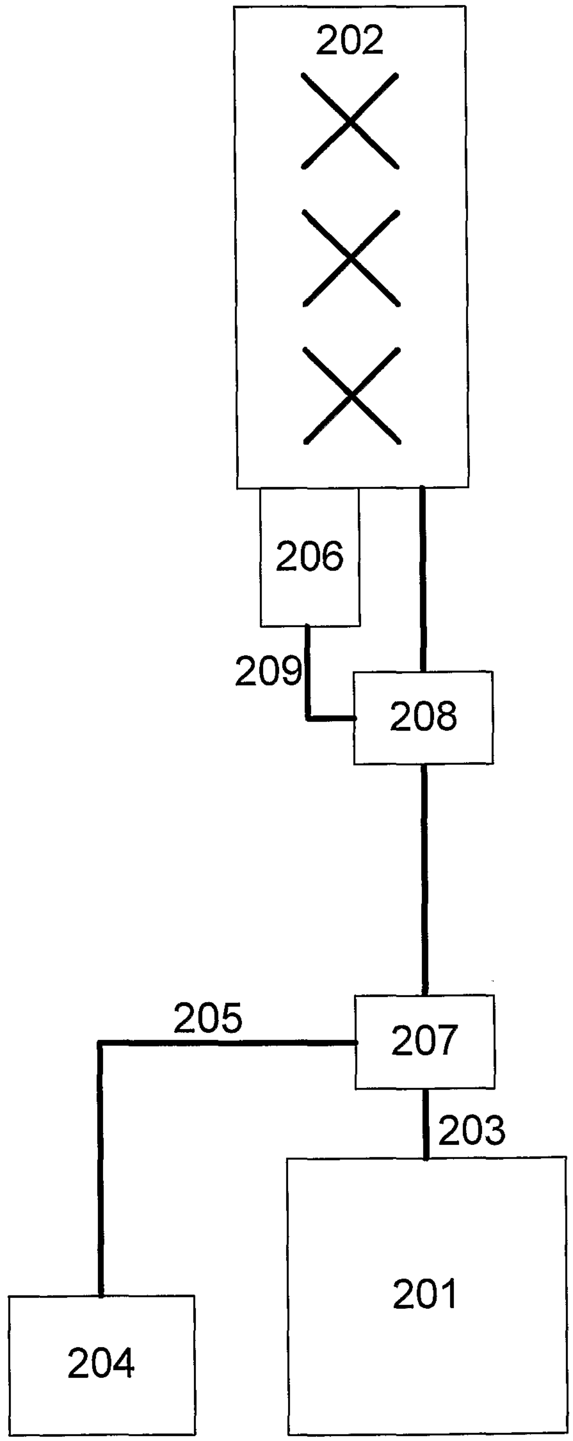
FIG. 2 shows a control system according to the background art.

FIG. 2 schematically shows an exemplary control system for controlling the radiation direction of an antenna beam according to the second alternative of the AISG standard. The control system in FIG. 2 includes a BTS/Node B 201 connected to an antenna 202 via a coaxial feeder cable 203 carrying RF signals to the antenna.

The control data for controlling the radiation direction of the antenna is created in a MCU 204 and sent to a converter 207 via an RS485 connection 205. The converter 207 receives the control data on the RS485 connection 205, modulates the data using OOK and superposes the OOK signals on the RF signals on the coaxial feeder cable 203.

A CILOC (Current Injector Layer One Converter) 208, connected to the coaxial cable 203, receives the RF signals and the superposed control data on the cable. The CILOC 208 can be included in a TMA (Tower mounted amplifier). The CILOC 208 demodulates the control data and sends the control data to a RET unit (Remote-Controlled Electrical Down-Tilt) unit 206 via a second RS485 connection 209.

Figure 3:
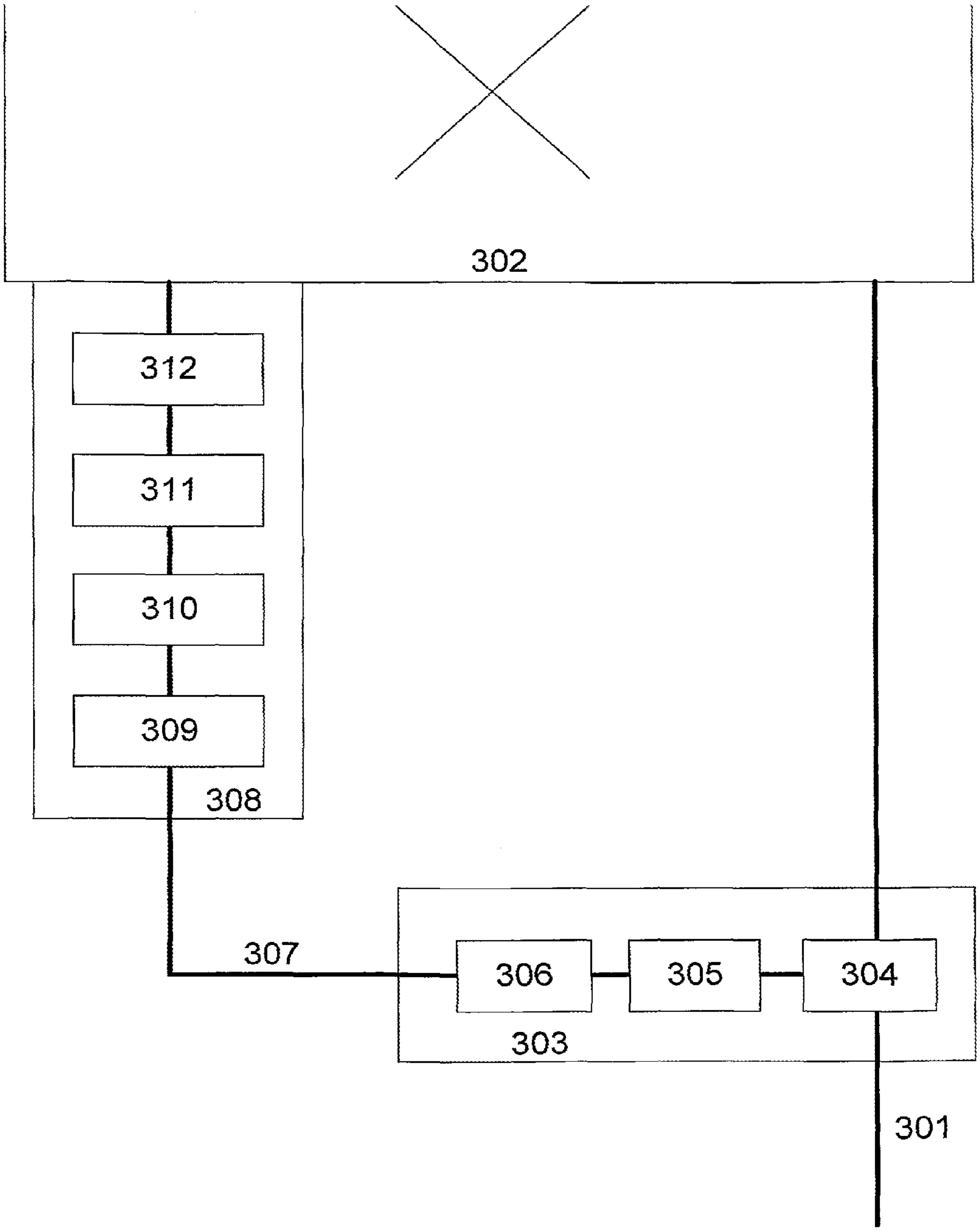
Fig. 3 (Prior Art)
FIG. 3 shows a control system according to the background art.

FIG. 3 shows the details of the CILOC and the RET unit according to the second alternative of the AISG standard.

The CILOC 303, is connected to the coaxial feeder cable 301 and receives the RF signals and the superposed control data on the cable. The CILOC 303 includes a filter 304, detecting means 305 such as a detector, and an RS485 circuit 306. The filter 304 filters out the OOK modulated control. The detector 305 then detects the OOK modulated control data and provides the control data to the RS485 circuit 306. The RS485 circuit 306 converts the control data into an RS485 signal being on the format suitable $f_o$r an RS485 connection. The control data is then sent from the CILOC 303 to a RET unit 308 via an RS485 connection 307.

The coaxial feeder cable 301 has one conductor and one screening wire. The control data signal on the coaxial cable 301 is further OOK modulated. The RS485 cable 307 has two conductors, one screening wire and one grounding wire. The control data signal received by the CILOC 303 thus has to be converted from OOK modulation and coaxial cable format into a format suitable for an RS485 connection. This is done by the RS485 circuit 306.

The control data is provided via the RS485 connection 307 to the RET unit 308. The RET unit includes a second RS485 circuit 309 that converts the control data from the RS485 signalling format to logical signal, such as TTL signals (Transistor Transistor Logic signals), readable by control means 310, such as a CPU (Central Processing Unit). The RS485 circuit 309 provides the TTL signals to the CPU 310. The CPU 310 processes the control data and sends the control data to a motor control circuit 311. The motor control circuit 311 produces motor control signals for controlling a motor 312. Controlled by the motor control signals the motor 312 alters the radiation direction of the antenna by displacing a phase shifting means.

The inventors have realised that the background art system shown in FIG. 3, working according to the AISG standard, can be simplified and be made more robust. An analysis of the background art system gives that the control signals are filtered out by filter 304 and detected by the detector 305 in the CILOC 303. The control signals are then first converted to a signal format suitable for an RS485 connection in an RS485 circuit 306, then provided to the RET unit 308 on an RS485 connection and then converted once more in an other RS485 circuit 309 into logical level signals readable by a CPU 310. The present invention aims to simplify the transfer of the control signals from the filter 304 to the CPU 310.

Figure 4:
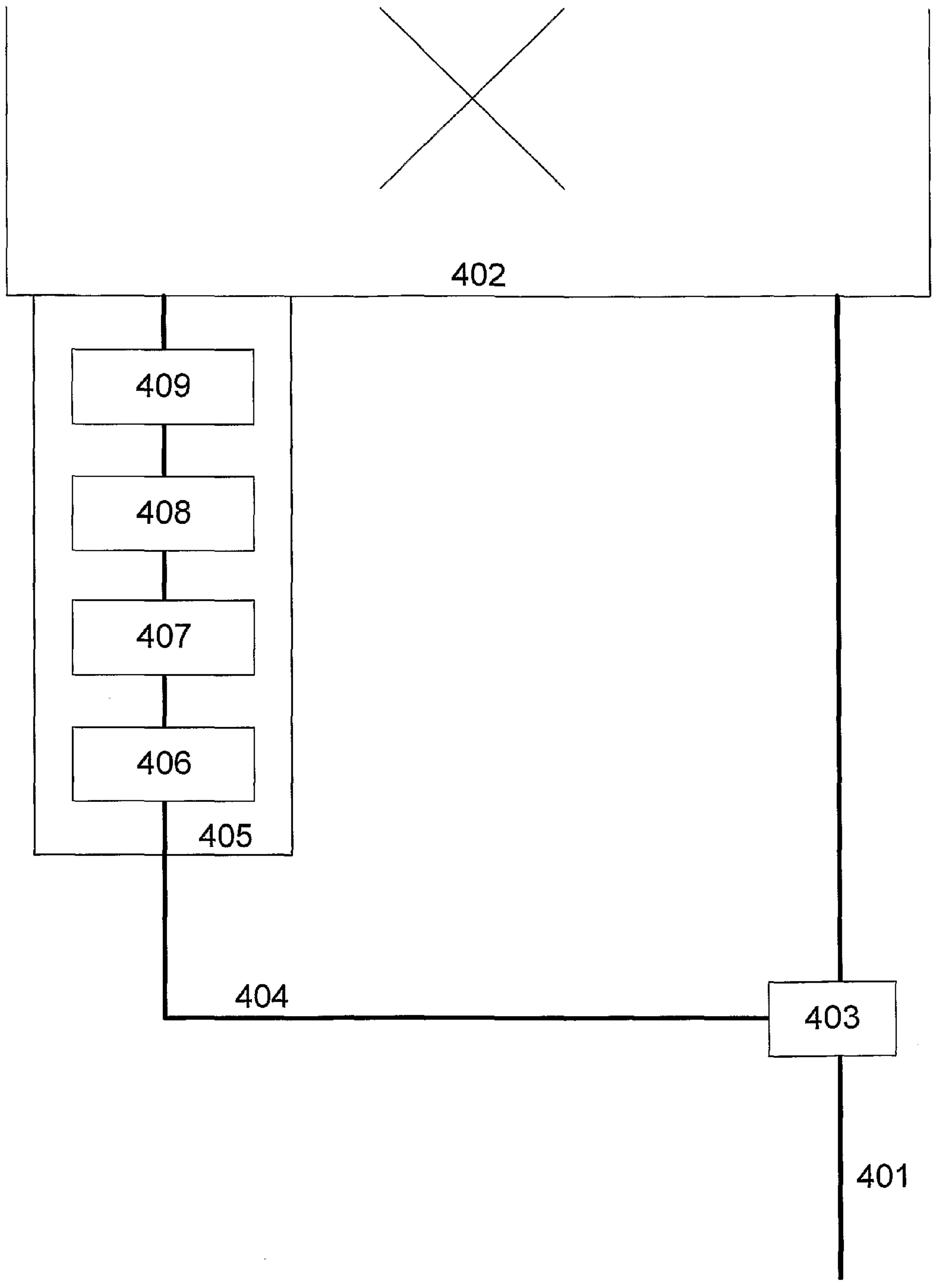
FIG. 4 shows an exemplary embodiment of a control system according to the invention.

An exemplary embodiment of a control system according to the present invention is shown in FIG. 4. A number of parts of the system in FIG. 4 are the same or similar to the ones shown in FIG. 3 and are placed at the same location in the control system as in FIG. 3. These parts are the coaxial feeder cable 401, the antenna 402, the external control unit 405 (the RET unit), the control means 407 (the CPU), the Motor control circuit 408 and the motor 409.

Some parts of the system have been changed or moved in the exemplary embodiment according to the invention. These parts are the CIN (Current Injector), the detecting means 406 and the jumper cable connection 404 between the CIN and the external control unit 405. The CIN is here just a filtering means 403, which is a much less complex circuit than the CILOC 303 in FIG. 3. The detecting means 406 is here moved from the CILOC in FIG. 3 and is incorporated in the external control unit 405.

The exemplary control system according to the invention does not use an RS485 connection for the control signals filtered out by the filtering means 403. The connection 404 is thus not an RS485 connection. There is therefore no need for the two RS485 circuits 306 and 309 shown in FIG. 3 in a system according to the invention.

The CIN here only includes filtering means 403 that filters out the OOK modulated control signals superposed on the feeder cable and directly provides these control signals on a jumper cable 404 to detecting means 406, such as a detector, which detects the OOK modulated control signals and provides the control signals to control means 407, preferably being a CPU, on a signal format readable by the control means 407. The CIN does here not include an RS485 circuit and the RET unit 405 does also not include an RS485 circuit as in the background art.

Two RS485 circuits can thus be omitted by implementation of the invention. The invention thereby reduces the number of circuits and the complexity in the control system. The control system according to the invention has less electronic circuitry and is thereby both more robust (for example less sensitive to lightning strikes and the like) and is less costly to produce.

The cable 404 is further a coaxial cable having one conductor and one screening wire compared to the RS485 cable 307 in FIG. 3 having two conductors, one screening wire and one grounding wire. Fewer conductors in the cable of the inventive solution mean that fewer conductors have to be protected against environmental problems, such as lightning strikes and the like.

In further embodiments of the invention, the motor 409 and the motor control circuit 408 can be partly or totally incorporated within the casing of the antenna 402.

In one embodiment, also shown in FIG. 4, the external control unit 405 includes the detecting means 406, the control means 407, the motor control circuit 408, and the motor 409. The filtering means 403 is situated outside the external control unit 405, close to the external control unit 405, or more far away.

In an alternative embodiment, the motor control circuit 408 and the motor 409 are situated within the casing of the antenna 402. The detecting means 406 and the control means 407 are in this embodiment situated outside the casing of the antenna 402, in the external control unit 405 attached to the antenna.

In another alternative embodiment the motor control circuit 408, the motor 409 and the control means 407 are situated within the casing of the antenna 402. The control means 407 can in this embodiment be placed behind a cover in the antenna casing, thereby being possible to switch and upgrade. The detecting means 406 is in this embodiment situated outside the casing of the antenna, in the external control unit 405 attached to the antenna.

The different embodiments of the placing of the motor 409, the motor control circuit 408, the control means 407 and the detecting means 406 have different advantages. It is generally advantageous, regarding robustness, to include as much as possible of the electronic circuitry within the antenna casing since this casing is constructed to be protected against environmental threats, such as lightning strikes and the like.

It is further an advantage, regarding robustness, to have as few external units as possible since external units have to be connected to the antenna with cables. External mast top cables are also exposed to the environmental threats and must be protected. This protection raises the production costs for the systems.

Thus, the embodiments in which most of the parts of the control system are situated within the casing of the antenna 402 have the positive feature to be well protected against environment since most of the circuitry and most of the cables are situated within the protected casing of the antenna 402.

The embodiments having a differing number of parts in the external control unit, outside the casing of the antenna, have the positive feature that they could be implemented in existing systems, without altering the contents of the antenna of the existing system. Such embodiments could thus be used for upgrading existing systems according to the teachings of the present invention. The embodiments according to the invention, having electric circuitry situated in the external control unit outside the casing of the antenna, have nevertheless better environmental protection than background art systems since two RS485 circuits and the RS485 connection present in background art systems are omitted.

A skilled person realises that there could be other possible embodiments having differing amount of circuitry situated inside and outside of the antenna casing and the external control unit. That could, for instance, depend on the construction of the antenna unit of the particular system in which the control system is to be implemented. It is also possible to place differing amount of electrical circuitry inside or outside of the external control unit. This is also realised by a person skilled in the art.

Figure 5:
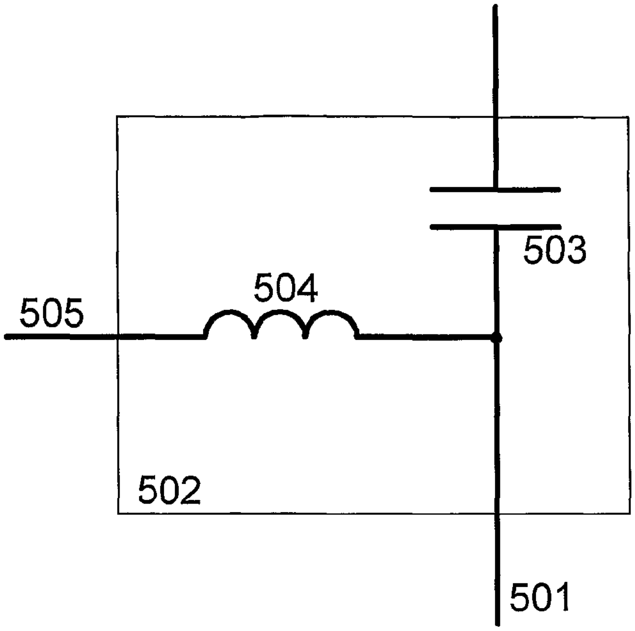
FIG. 5 shows schematically the major components of an exemplary embodiment of the filtering means.

FIG. 5 schematically shows the major components of an exemplary embodiment of the CIN of the present invention. The CIN is connectable to the feeder cable 501 that carries RF signals between BTS/ Node B and the antenna. The CIN includes a filtering means 502, including a capacitor 503 and an inductor 504, that filters out DC and control signals for the antenna from the RF signals on the feeder cable 501. The control signals on the feeder cable have a much lower frequency than the RF signals. The control signals can, for example be 2 MHz OOK signals. Also other frequencies and modulations can be used for the control signals. DC and control signals are provided to a jumper cable 505 that delivers the control signals to a detector in the external control unit. The CIN can be included in a TMA (Tower mounted amplifier) or be situated outside a TMA.

Figure 6:
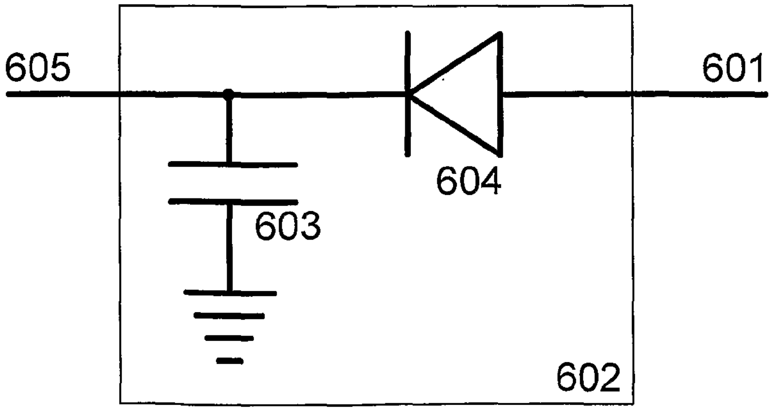
FIG. 6 shows schematically the major components of an exemplary embodiment of the detecting means.

FIG. 6 schematically shows the major components of an exemplary embodiment of the detecting means 602 of the present invention. The detecting means 602 receives OOK modulated signals on a jumper cable 601. The detecting means includes a level detecting circuit, including a diode 604 and a capacitor 603, which detects the control signals. These detected control signals are provided to a CPU connection 605 for delivery to the control means (CPU). The DC is used by the motor 409 in FIG. 4 and other electrical circuitry in the antenna unit.

As is said above, FIGS. 5 and 6 show schematic views of the major parts of the CIN and detecting means. A skilled person realises that the CIN and detecting means could be implemented differently and that there could be more or other parts present in the CIN and detecting means that are not shown in FIGS. 5 and 6. The detector could for instance also include transistor circuits and filters.

In an embodiment of the present invention the MCU 204 provides OOK modulated control data to the converting means 207 that superposes them on the RF signal on the feeder cable. In this embodiment RS485 is not used at all for controlling the radiation direction of the antenna, OOK signals are instead used all the way from the MCU to the RET unit. No RS485 converting circuits or RS485 cables are thus needed for this embodiment, which makes the control system both less complex and less costly.

In an embodiment of the invention the control data can be modulated using other modulation than OOK. FSK (Frequency Shift Keying) or any other type of suitable modulation can be used for modulating the control data according to this embodiment. Different kinds of modulations have different characteristics regarding bitrate and robustness as is known by a skilled person. The type of modulation to be used is preferably chosen with respect to these characteristics.

The control system, the base station, the communication system and the method for controlling according to the invention may be modified by those skilled in the art, as compared to the exemplary embodiments described above.

A number of different components, circuits and cables can, for instance, be used for implementing a control system according to the invention. The different parts of a control system according to the invention can also be situated in different parts and casings of existing antenna systems.

As is obvious for a skilled person, a number of other implementations, modifications, variations and/or additions can be made to the above described exemplary embodiments. It is to be understood that the invention includes all such other implementations, modifications, variations and/or additions which fall within the scope of the claims.

The invention claimed is:

1. A control system for controlling radiation direction of an antenna beam of an antenna, the radiation direction being adjustable by an actuating device influencing phase shifting means based on an actuating signal, the system comprising:

filtering means connected, in use, to a feeder cable arranged for carrying RF signals and a control signal, said filtering means being arranged for filtering out said control signal, and an external control unit, attached to said antenna, including detecting means and control means, said detecting means being arranged for detecting said filtered out control signal, said control means being arranged for producing the actuating signal based on the detected control signal, wherein said filtering means is directly connected to said external control unit so as to provide the filtered out control signal directly to said external control unit.

2. The control system defined in claim 1, wherein the detected control signal is in a signal format suitable for input in a logical circuit.

3. The control system defined in claim 1, wherein said control means is a processor.

4. The control system defined in claim 1, wherein converting means is arranged for supplying control signals to the feeder cable.

5. The control system defined in claim 4, wherein said converting means is arranged for modulating control signals and supplying the modulated control signals to the feeder cable.

6. The control system defined in claim 5, wherein the control signals are modulated using OOK (On Off Keying).

7. The control system defined in claim 5, wherein the control signals are modulated using FSK (Frequency Shift Keying).

8. The control system defined in claim 4, wherein said converting means is arranged for superposing control signals on the RF signal on the feeder cable.

9. The control system defined in claim 1, wherein said filtering means includes a capacitor and an inductance.

10. The control system defined in claim 1, wherein said detecting means includes a diode and a capacitor.

11. The control system defined in claim 1, wherein said filtering means is located inside a TMA (Tower Mounted Amplifier).

12. The control system defined in claims 1, wherein the external control unit is a RET (Remote-Controlled Electrical Down-Tilt) unit.

13. The control system defined in claim 1, wherein second control means is arranged for providing control signals to said converting means.

14. The control system defined in claim 13, wherein the control signals being provided to said converting means are in signal format RS485.

15. The control system defined in claim 13, wherein the control signals being provided to said converting means are OOK modulated.

16. A base station including a control system as defined in claim 1.

17. Method for controlling radiation direction of an antenna beam of an antenna, the radiation direction being adjustable by an actuating device influencing phase shifting means based on an actuating signal, the method including the steps of:

filtering out a control signal in filtering means being connected, in use, to a feeder cable arranged for carrying RF signals and control signals, detecting said filtered out control signal in detecting means located in an external control unit attached to said antenna, and producing the actuating signal in control means, also located in said external control unit, based on the detected control signal, wherein said filtering means provides the filtered out control signal directly to said external control unit.

* * * * *